(12) United States Patent
Pekny et al.

(10) Patent No.: US 6,937,517 B2
(45) Date of Patent: Aug. 30, 2005

(54) CLOCK REGULATION SCHEME FOR VARYING LOADS

(75) Inventors: Theodore T. Pekny, Milititas, CA (US); Stephen J. Gualandri, Campbell, CA (US)

(73) Assignee: Micron Technology, Inc., Boise, ID (US)

( * ) Notice: Subject to any disclaimer, the term of this patent is extended or adjusted under 35 U.S.C. 154(b) by 284 days.

(21) Appl. No.: 10/197,782

(22) Filed: Jul. 18, 2002

(65) Prior Publication Data

US 2004/0012436 A1 Jan. 22, 2004

(51) Int. Cl.$^7$ ............ G11C 16/04; G11C 16/06
(52) U.S. Cl. ............ 365/185.18; 365/185.22; 365/185.29; 365/185.33
(58) Field of Search .......... 365/185.18, 185.22, 365/185.29, 185.33

(56) References Cited

U.S. PATENT DOCUMENTS

| | | | | |
|---|---|---|---|---|
| 5,343,434 A | * | 8/1994 | Noguchi | 365/185.22 |
| 5,781,473 A | * | 7/1998 | Javanifard et al. | 365/185.18 |
| 5,801,987 A | * | 9/1998 | Dinh | 365/185.18 |
| 6,754,107 B2 | * | 6/2004 | Khouri et al. | 365/185.18 |
| 6,771,547 B2 | * | 8/2004 | Tanzawa et al. | 365/185.18 |

* cited by examiner

*Primary Examiner*—Trong Phan
(74) *Attorney, Agent, or Firm*—Williams, Morgan & Amerson, P.C.

(57) ABSTRACT

The present invention provides a method and apparatus for regulating clocks for varying loads. The method includes providing a regulated signal of a first amplitude during a first operating mode and a regulated signal of a second amplitude during a second operation mode. The method further includes driving at least one of a first load and a second load based on the regulated signal.

28 Claims, 5 Drawing Sheets

CLOCK REGULATION SCHEME FOR VARYING LOADS

BACKGROUND OF THE INVENTION

1. Field of the Invention

This invention generally relates to a semiconductor device, and, in particular, to a clock regulation scheme for varying loads in a memory device, such as a flash memory.

2. Description of the Related Art

Advancements in the memory technology have resulted in improved memories at a lower price. For example, flash memories today store a greater number of bits per unit of area at an overall lower cost-per-megabyte. The affordable price of flash memory has made it a popular choice among many application developers.

Flash memory (sometimes called "flash RAM") is a type of non-volatile memory that can be erased and reprogrammed in units of memory called blocks. Flash memory is a variation of electrically erasable programmable read-only memory (EEPROM) that, unlike flash memory, is erased and rewritten at the byte level, which is slower than block updating. Flash memory is commonly used to hold control code such as the basic input/output system (BIOS) in a personal computer. When BIOS needs to be changed (rewritten), the flash memory can be written in block (rather than byte) sizes, making it faster to update. Applications employing flash memory include digital cellular phones, digital cameras, LAN switches, computers, digital set-up boxes, embedded controllers, and other devices.

Flash memories sometimes employ a high voltage pump to generate a variety of different voltages. The pump output voltage desired is typically dictated by the mode of operation of the flash memory, where each mode of operation may have a different load and current requirement. The voltage pumps are commonly designed to handle the maximum load. Designing the voltage pumps to handle the maximum load, however, can create overshoot and ripple problems when the load is less than the maximum. With lighter loads, for example, the pump may overshoot its target regulation value because the delta output voltage with each input clock of the pump may be too great.

The present invention is directed to overcoming, or at least reducing the effects of, one or more of the problems set forth above.

SUMMARY OF THE INVENTION

In one aspect of the instant invention, a method is provided for regulating clocks for varying loads. The method includes providing a regulated signal of a first amplitude during a first operating mode and a regulated signal of a second amplitude during a second operation mode. The method further includes driving at least one of a first load and a second load based on the regulated signal.

In another aspect of the instant invention, an apparatus is provided for regulating clocks for different modes of operation. The apparatus includes a regulator and a pump communicatively coupled to the voltage regulator. The regulator is adapted to provide a first regulated signal of a first voltage level associated with a first operation mode and a second regulated signal of a second voltage level associated with a second operation mode. The pump is adapted to provide a first output signal for the first operation mode based on the first regulated signal and a second output signal for the second operation mode based on the second regulated signal.

In yet another aspect of the instant invention, a system employing a clock regulation scheme for varying operation modes is provided. The system includes an accessing device and a memory associated with the accessing device. The memory is adapted to provide a first regulated signal of a first voltage level associated with a erase mode, a second regulated signal of a second voltage level associated with a program mode, and a third regulated signal of a third voltage level associated with a program verify mode. The memory is further adapted to provide a first output signal for the erase mode based on the first regulated signal, a second output signal for the program mode based on the second regulated signal, and a third output signal for the program verify mode based on the third regulated signal.

BRIEF DESCRIPTION OF THE DRAWINGS

The invention may be understood by reference to the following description taken in conjunction with the accompanying drawings, in which like reference numerals identify like elements, and in which.

Figure 1:
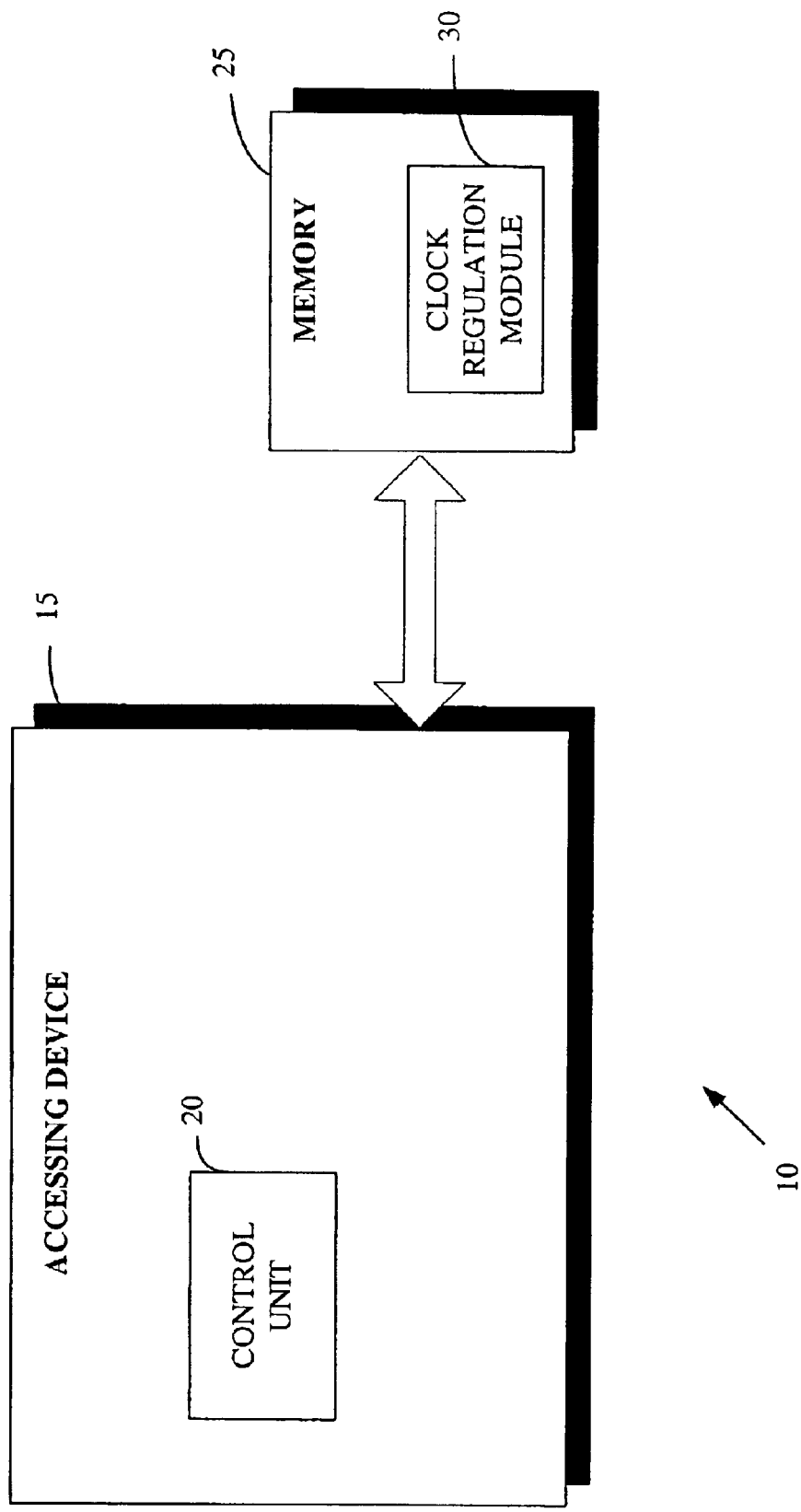
FIG. 1 is a block diagram of a system including a device that is capable of accessing a memory having a clock regulation module, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a system 10 is illustrated, in accordance with one embodiment of the present invention. The system 10 includes an accessing device 15 having a control unit 20 that is capable of accessing data (including code) stored in a memory 25. The accessing device 15 may be any device that uses the memory 25 to store data, read data, or both. Examples of the accessing device 15 may include, but are not limited to, a computer, camera, telephone, television, radio, calculator, personal digital assistant, network switch, setup-box, and the like.

The control unit 20, in one embodiment, may manage the overall operations of the accessing device 15, including writing and reading data to and from the memory 25. The control unit 20 may include a microprocessor, a microcontroller, a digital signal processor, a processor card (including one or more microprocessors or controllers), a memory controller, or other control or computing devices.

The memory 25 in the illustrated embodiment is a non-volatile memory, such as flash memory. The memory 25, in one embodiment, may be an external memory, such as a memory stick, and may be accessed when inserted into a slot (not shown) of the accessing device 15. When inserted into the accessing device 15, the accessing device 15 provides the appropriate power and control signals to access the memory 25. An external memory 25 may also be accessed by the accessing device 15 through, for example, an external cable. In one embodiment, the memory 25 may be internal to or integrated in the accessing device 15. The accessing device 15, such as a computer, may employ an integrated memory 25 to store, for example, the BIOS (basic input/output system) of the accessing device 15.

The memory 25 in the illustrated embodiment includes a clock regulation module 30. As described in more detail below, the clock regulation module 30 regulates the clocks used by a voltage pump 230 (shown in FIG. 2) to different voltages, depending on the load coupled to the voltage (or charge) pump. For illustrative purposes, the clock regulation module 30 is herein described with respect to flash memories; however, it should be appreciated that the clock regulation module 30 may be applicable to other types of memories and to other non-memory devices in which analog charge pumps may be employed.

Figure 2:
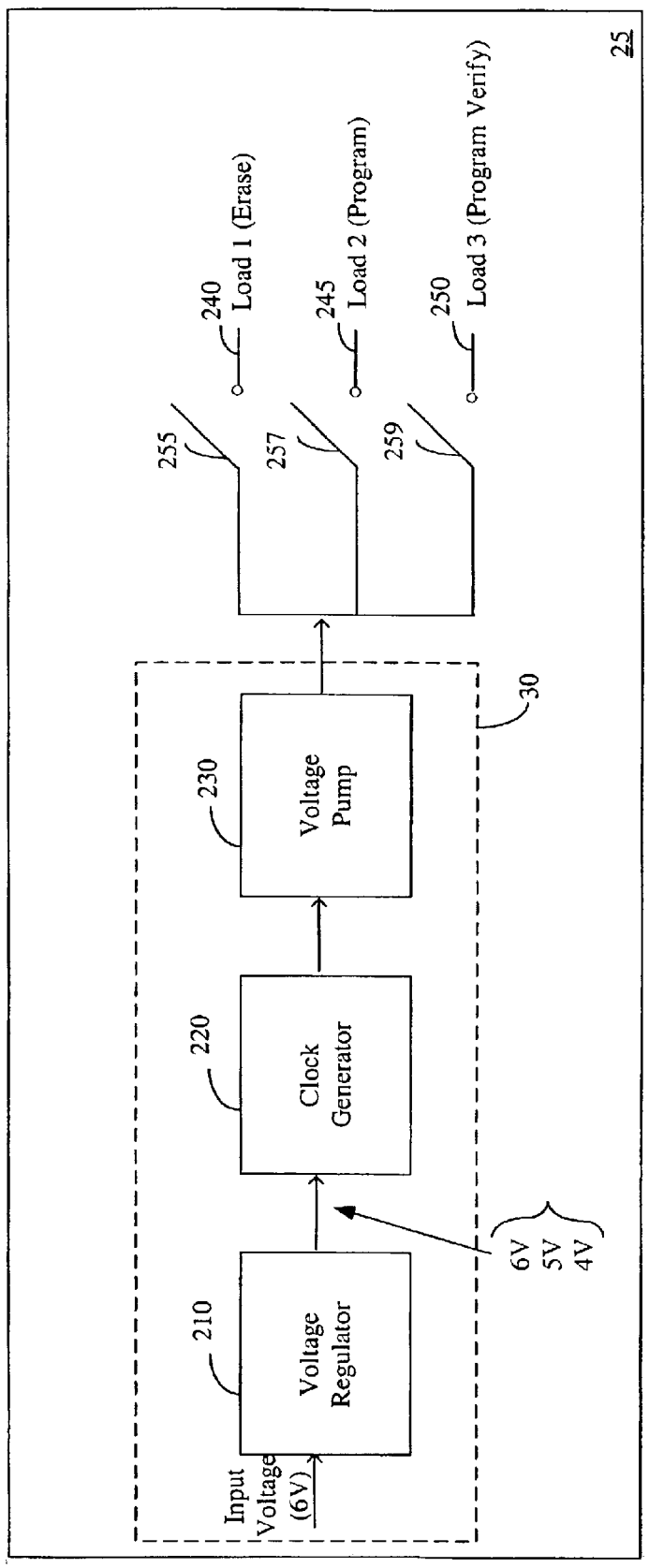
FIG. 2 is a block diagram of the memory of FIG. 1 employing the clock regulation module, in accordance with one embodiment of the present invention.

Turning now to FIG. 2, a block diagram of the clock regulation module 30 of the memory 25 of FIG. 1 is illustrated, in accordance with one embodiment of the present invention. The clock regulation module 30 includes a voltage regulator 210, a clock generator 220, and a voltage pump 230. An output terminal of the voltage pump 230 may be coupled to any one of various loads 240, 245, 250, at any given time, through respective switches 255, 257, 259. The number of loads 240, 245, 250 supported by the voltage pump 230 is a matter of design choice, and thus may vary from one implementation to another.

As described in more detail below, in the illustrated embodiment, the voltage regulator 210 provides one of three regulated signals (e.g., a 6-volt signal, 5-volt signal, 4-volt signal) depending on the load conditions. The clock generator 220 level shifts the signal from the voltage regulator 210 and generates one or more clock phases for the voltage pump 230. The number of clock phases generated by the clock generator 220 may vary according to the requirements of the voltage pump 230. For example, a two-phase voltage pump 230 requires a clock generator 220 that is capable of producing two clock phases. In FIG. 2, the clock phases generated by the clock generator 220, based on the regulated signal from the voltage regulator 210, are provided to the voltage pump 230, which then drives the appropriate load 240, 245, 250.

In the illustrated embodiment, depending on the mode of operation, the voltage pump 230 is coupled to one of the loads 240, 245, 250. For example, a first mode of operation may represent an "erase" mode in which the voltage pump 230 provides a signal of a first voltage level (e.g., 10 volts) to erase a block (or a sector) of memory cells of the memory 25. A second mode of operation may represent a "program" mode in which the voltage pump 230 supplies a signal of a second voltage level (e.g., 8.5 volts) to program sixteen or thirty-two bits, for example. A third mode of operation may represent a "program verify" mode in which the voltage pump 230 provides a signal of a third voltage level (i.e., 6.5 volts) for verifying one or more words. Each mode of operation may represent a different load from the perspective of the voltage pump 230 because the voltage pump 230 may supply voltage to different configurations in each mode. For example, in the "program" mode, the voltage pump 230 may supply power to a single word line, whereas in the "erase" mode, the voltage pump 230 may erase an entire sector of memory cells using multiple word lines.

Figure 3:
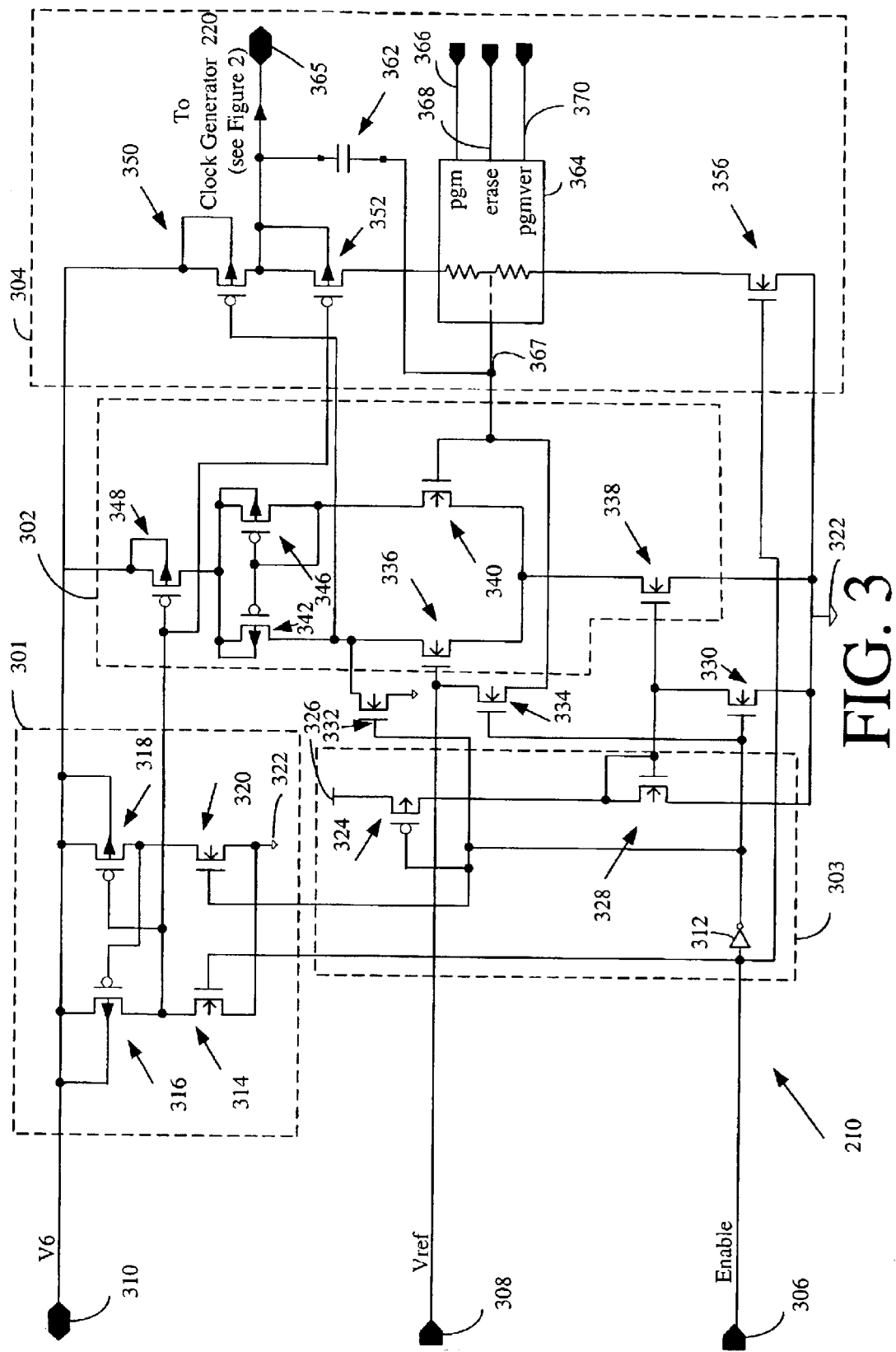
FIG. 3 illustrates a schematic diagram of a voltage regulator that may be employed in the clock regulation module of FIG. 2, in accordance with one embodiment of the present invention.

Referring now to FIG. 3, a schematic diagram of the voltage regulator 210 of FIG. 2 is illustrated, in accordance with one embodiment of the present invention. In the illustrated embodiment, the voltage regulator 210 has four general functional components (shown in dotted boxes), which include a voltage translator 301, a comparator 302, a biasing circuit 303 for the comparator 302, and a feedback circuit 304.

The interconnections of various elements of the voltage regulator 210 are described first, and the operation of the voltage regulator 210 is described thereafter. The voltage regulator 210 receives an enable input signal from a node 306, a Vref signal from a node 308, and a signal from a node 310. Although not so limited, in the illustrated example, the voltage at the Vref node 308 is approximately 1.25 volts, and the voltage at the node 310 is approximately 6 volts. The enable signal from the node 306 is provided to an input terminal of an inverter 312 of the biasing circuit 303 and to a gate terminal of a transistor 314 of the voltage translator 301.

As shown, in addition to the transistor 314, the voltage translator 301 includes transistors 316, 318, and 320. In the illustrated embodiment, the transistors 316 and 318 are p-channel devices, and the transistors 314 and 320 are n-channel devices. A source terminal of the transistor 314 is coupled to a drain terminal of the transistor 316 and a gate terminal of the transistor 318. A source terminal and a N-well connection of the transistor 316 and a source terminal and a N-well connection of the transistor 318 are coupled to the node 310. A gate terminal of the transistor 316 is coupled to a drain terminal of the transistor 318 and a source terminal of the transistor 320. The drain terminals of the transistors 314 and 320 are each coupled to ground node 322. A gate terminal of the transistor 320 is coupled to an output terminal of the inverter 312 of the biasing circuit 303.

The biasing circuit 303 includes the transistors 324, and 328. In the illustrated embodiment, the transistor 324 is a p-channel device and the transistor 328 is an n-channel device. A gate terminal of the transistor 324 is coupled to the output terminal of the inverter 312 and to the drain terminal of the transistor 320 of the voltage translator 301. A source terminal of the transistor 324 is coupled to a node 326, which in the illustrated embodiment is coupled to Vcc (approximately 1.8 volts). A drain terminal of the transistor 324 is coupled to a source terminal of the transistor 328. A gate terminal of the transistor 328 is coupled to its source terminal.

The regulator includes a transistor 330, which in the illustrated embodiment is an n-channel device. A source terminal of the transistor 330 is coupled to the gate terminal of the transistor 328 of the biasing circuit 303. A gate terminal of the transistor 330 is coupled to the output terminal of the inverter 312, and a drain terminal is coupled to the drain terminal of the transistor 328.

The voltage regulator 210 further includes transistors 332 and 334, both of which in the illustrated embodiment are n-channel devices. A gate terminal of the transistor 332 is coupled to the output terminal of the inverter 312, and a drain terminal is coupled to the ground node 322. A source terminal of the transistor 332 is coupled to a source terminal of a transistor 336 of the comparator 302. A gate terminal of the transistor 334 is coupled to the output terminal of the inverter 312, and a source terminal is coupled to the Vref node 308. A drain terminal of the transistor 334 is coupled to a gate terminal of the transistor 340 of the comparator 302.

The comparator 302 includes the transistors 336, 338, 340, 342, 346, and 348. In the illustrated embodiment, the transistors 342, 346, and 348 are p-channel devices, and the transistors 336, 338, and 348 are n-channel devices. A drain terminal of the transistor 336 is coupled to the Vref node 308, and the drain terminal of transistor 336 is coupled to a drain terminal of the transistor 340 and to a source terminal of the transistor 338. A gate terminal of the transistor 338 is coupled to the gate terminal of the transistor 328 of the biasing circuit 303, and a drain terminal of the transistor 338 is coupled the ground node 322. A gate terminal of the transistor 340 is coupled to the drain terminal of the 334 transistor.

A source terminal of the transistor 340 of the comparator 302 is coupled to a drain terminal of the transistor 346. The drain terminal of the transistor 346 is further coupled to its gate terminal. A source terminal of the transistor 346 is coupled to a source terminal of the transistor 342, and a N-well connection of the transistors 342, 346 is further coupled to the source terminals of those transistors. The gate terminals of the transistors 342, 346 are coupled to each other.

The comparator 302 includes the transistor 348, which has a drain terminal coupled to the source terminals of the transistors 342 and 346, and a gate terminal coupled to the gate terminal of the transistor 318 and drain terminal of the transistor 316. A N-well connection and a source terminal of the transistor 348 are coupled to each other, and the source terminal of the transistor 348 is further coupled to the node 310.

The comparator 302 includes the transistor 338, which has a drain terminal coupled to the ground node 322, and a source terminal coupled to the drain terminals of the transistors 342 and 336. A gate terminal of the transistor 338 is coupled to the gate terminal of the transistor 328 and source terminal of the transistor 330.

The feedback circuit 304 includes the transistors 350, 352, and 356, a capacitor 362, and a module 364. In the illustrated embodiment, the transistors 350 and 352 are p-channel devices, and the transistor 356 is an n-channel device. A gate terminal of the transistor 350 is coupled to the drain terminal of the transistor 342 of the comparator 302. A source terminal and a N-well connection of the transistor 350 are coupled to the node 310, and a drain terminal is coupled to a source terminal of the transistor 352. A gate terminal of the transistor 352 is coupled to the gate terminal of the transistor 348 of the comparator 302, and a source terminal and N-well connection of the transistor 352 is coupled to an output node 365 of the voltage regulator 210. A first terminal of the capacitor 362 is coupled to the output node 365 and a second terminal of the capacitor 362 is coupled to a feedback node 367, which is coupled to the gate terminal of the transistor 340 and drain terminal of the transistor 334 of the comparator 302. The transistor 356 of the feedback circuit 304 has a gate terminal coupled to the input terminal of the inverter 312 and a drain terminal coupled to the ground node 322.

The module 364 of the feedback circuit 304 is coupled between the transistors 352 and 356. In particular, a first terminal of the module 364 is coupled to a drain terminal of the transistor 352, and a second terminal of the module 364 is coupled to the source terminal of the transistor 356. A third terminal of the module 364 is coupled the node 367. In the illustrated embodiment, the module 364 is adapted to receive a signal on one of the lines 366, 368, 370 to respectively select an operation mode of program, erase, and program verify.

The operation of the voltage regulator 210 is described next. Generally, the voltage regulator 210 provides a regulated voltage value to the clock generator 220 when the enable signal is provided to the node 306. In the illustrated embodiment, although not so limited, the voltage regulator 210 provides a signal having substantially 6, 5, or 4 volts to the clock generator 220, depending on the indicated mode of operation asserted on the lines 366, 368, 370, as described in more detail below.

When the enable signal is asserted, the bias circuit 303 turns on because the gate of the transistor 324 becomes low (i.e., closer to ground). As such, the current from the transistor 328 of the biasing circuit 303 is mirrored to the transistor 338 of the comparator 302. Upon proper biasing, the comparator 302 compares the Vref voltage at the node 308, which is also the voltage at the gate terminal of the transistor 336, to the feedback voltage at the node 367, which is also the voltage at the gate terminal of the transistor 340. In general, the voltage regulator 210 adjusts the voltage level at its output node 365 until the voltage at the feedback node 367 is approximately equal to the Vref voltage (at the node 308).

Assuming that the voltage regulator 210 is enabled, when a particular operation mode is selected (based on the assertion of one of the lines 366, 368, 370), a pre-selected resistor ratio in the module 364 regulates the voltage at the output node 365 to a desired value. Thus, the desired output value depends on the resister trim value set in the module 364 that is associated with a particular mode of operation. For example, for the "erase" mode, the resistor ratio may be such that it causes the voltage regulator 210 to regulate its output to approximately 6. The voltage regulator 210 regulates to a higher voltage because the resistor ratio associated with the "program" mode may be set relatively low (i.e., closer to ground) such that it takes a higher voltage level at the output node 365 to raise the voltage level of the feedback node 367 to that of the Vref node 308. Once the voltage level at the feedback node 367 equals approximately Vref, the transistor 350 turns off the voltage regulator 210. To move the regulated voltage lower, the resistor ratio may be set relatively high (i.e., more positive) such that it takes a lower voltage level at the output node 365 to cause the feedback node 367 to substantially equal the voltage level of the Vref node 308.

Thus, in general, if the voltage level at the feedback node 367 is below the voltage level of the Vref node 308, the voltage regulator 210 turns on and output voltage at the node 365 climbs until the voltage at the feedback node 367 substantially matches the voltage at the Vref node 308. Once the voltages at the nodes 367 and 308 are substantially equal, the voltage regulator 210 turns off.

The voltage translator 301 generally enables or disables the voltage regulator 210 by controlling the transistor 348 of the comparator 302. The voltage translator 301 activates the transistor 348 by providing a relatively low analog signal (e.g., ~ground) to its gate terminal. This occurs when the enable signal from the node 306 is asserted, thereby turning on the transistor 314, which then substantially grounds the gate terminal of the transistor 348. The voltage translator 301 deactivates the transistor 348 by providing a relatively high analog signal (e.g., ~voltage level of the node 310) to its gate terminal. That is, the deactivation occurs as follows: when the enable signal from the node 306 is not asserted, the output of the inverter 312 goes high, which turns on the transistor 316 (via the transistor 320) and allows the gate terminal of the transistor 348 to be charged to substantially the voltage level of the node 310.

Figure 4:
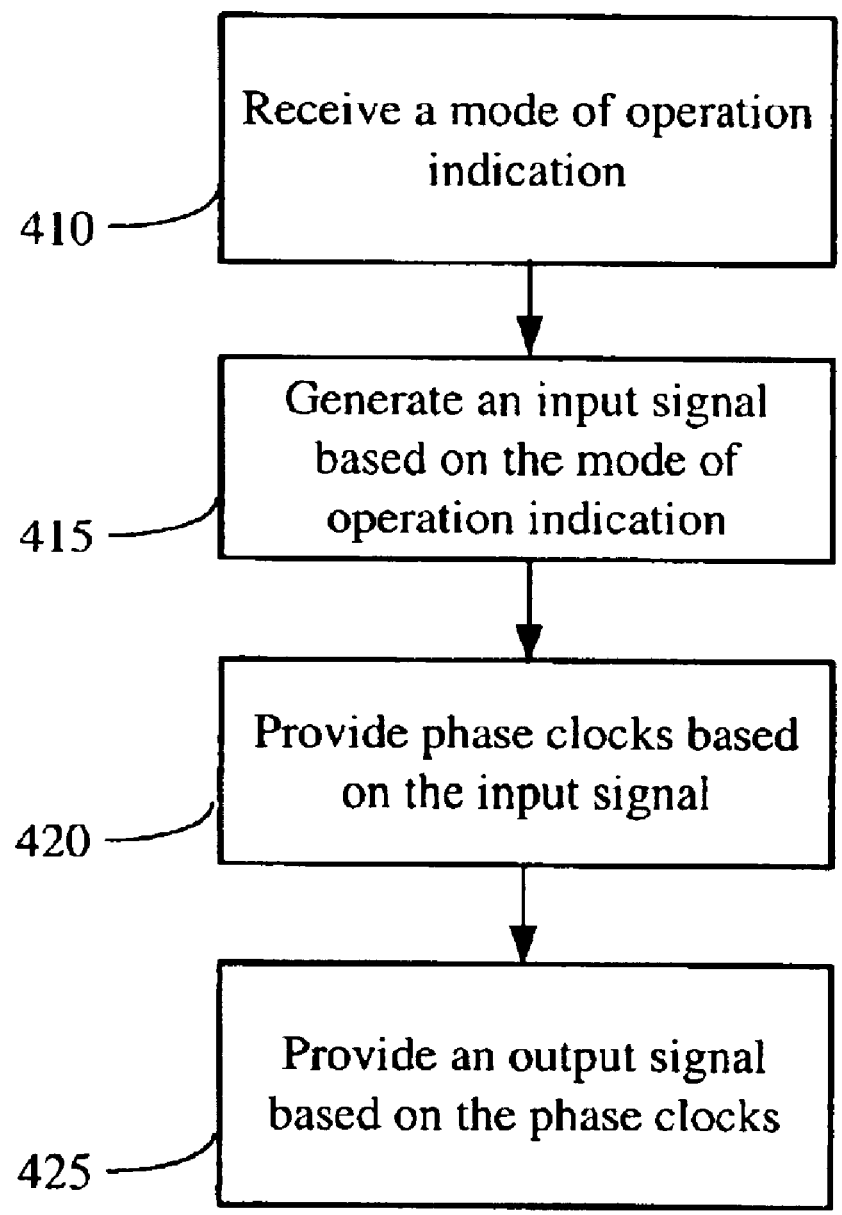
FIG. 4 illustrates a flow diagram that may be employed by the memory of FIG. 2, in accordance with one embodiment of the present invention.

Referring now to FIG. 4, a flow diagram of a method that may be implemented in the memory 25 of FIG. 2 is illustrated, in accordance with one embodiment of the present invention. The voltage regulator 210 receives (at 410) a mode of operation indication. In one embodiment, the mode of operation indication may be received (at 410) by the module 364 (see FIG. 3) of the voltage regulator 210 via the lines 366, 368, and 370. Although not so limited, the illustrated embodiment of FIG. 2 employs three modes of operation: erase, program, and program verify.

The voltage regulator 210 generates (at 415) an input signal based on the mode of operation indication received (at 410) by the module 364 of the voltage regulator 210. For example, in the illustrated example of FIG. 2, the voltage regulator 210 generates a 6-volt signal for the erase mode of operation, a 5-volt operation for the program mode, and a 4-volt signal for the program verify mode of operation. Thus, in one embodiment, the voltage regulator 210 varies the amplitude of the signal that is provided to the clock generator 220 based on the mode of operation or load requirements.

The clock generator 220 provides (at 420) phase clocks to the voltage pump 230 based on the input signal generated (at 415) by the voltage regulator 210. In one embodiment, providing the phase clocks (at 420) may include the clock generator 220 level shifting the input signal generated (at 415) by the voltage regulator 210.

The voltage pump 230 provides (at 425) an output signal to one of the three loads 240, 245, 250 based on the phase clocks of the clock generator 220. Exemplary output signal waveforms of the voltage pump 230 are illustrated in a graph of FIG. 5, which is discussed in greater detail below.

Thus, in accordance with one embodiment of the present invention, the clock signal that is provided to the voltage pump 230 is regulated. As such, depending on the mode of operation and, therefore, the load requirements, the clock voltage is regulated to different values. When a relatively high load is driven by the voltage pump 230, a higher voltage is utilized to clock the voltage pump 230. When a relatively low load is coupled to the voltage pump 230, a lower clock voltage is employed. Accordingly, by regulating the voltage value of the clocks provided by the clock generator 220 based on the load requirements, it is possible to reduce pump overshoot and ripple while maintaining an output-voltage ramp rate in a desired range. Additionally, regulating the clocks of the clock generator 220 reduces the occurrences of the internal components of the voltage pump 230 crossing the breakdown threshold, thereby possibly extending the life of the voltage pump 230.

Figure 5:
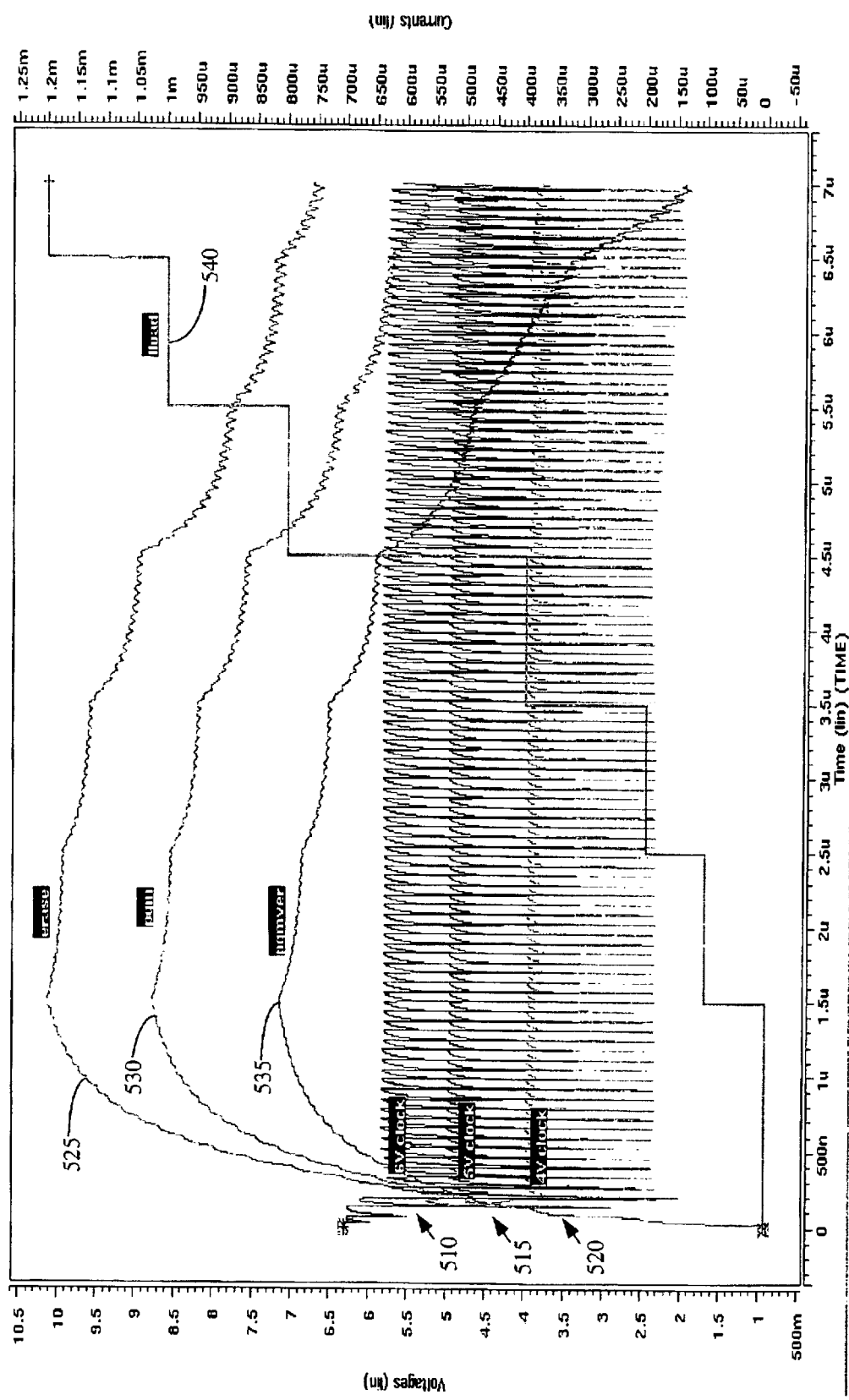
FIG. 5 illustrates a graph of exemplary signals of the clock regulation module of FIG. 2, in accordance with one embodiment of the present invention.

Referring now to FIG. 5, an exemplary graph showing various signals of the clock regulation module 30 of FIG. 2 is depicted, in accordance with one embodiment of the present invention. For ease of illustration and for comparison purposes, various signals of the clock regulation module 30 are superimposed on a single graph, although those skilled in the art will appreciate that these signals may not necessarily be present in the clock regulation module 30 at the same time.

FIG. 5 illustrates exemplary signals 510, 515, 520 that are produced by the voltage regulator 210 (see FIG. 2). The y-axis (on the left side) represents the voltage level of the various signals, and the x-axis represents time, in microseconds. In particular, the signals 510, 515, and 520 represent the 6-volt signal, 5-volt signal, and 4-volt signal, respectively, for the respective erase, program, and program verify modes of the memory 25 (see FIG. 2).

FIG. 5 also illustrates the output signals 525, 530, and 535 of the voltage pump 230 (see FIG. 2) of the clock regulation module 30. Based on the input signals 510, 515, 520, the voltage pump 230 respectively generates the signal 525 for the erase mode, the signal 530 for the program mode, and the signal 535 for the program verify mode. As mentioned, for ease of illustration and comparison purposes, the three output signals 525, 530, and 535 are superimposed on top of each other on a single graph.

FIG. 5 additionally illustrates a load line 540 that represents a fixed current loading on the voltage pump 230. The axis for the load line 540 is shown on the right hand side. The load line 540 indicates the amount of current that may be drawn from the voltage pump 230 for a given voltage level. The load line 540 in the illustrated example is shown from a range of approximately 0 amps to 1.2 milliamps. The various steps of the load line 540 represent the increase in the current load (as indicated by the right hand side axis). Based on the load line 540, it is possible to determine at least the approximate maximum voltage that the voltage pump 230 can provide for a given current load value. For example, at a current load of 200 microamps, the voltage pump 210 can provide substantially 7 volts during the program verify mode. Similarly, other voltage values of other modes can be determined for a given current load.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

receiving a first input signal having a first voltage level, wherein the first input signal is associated with a first load;

providing, based on the first input signal, a first output signal from a charge pump to drive the first load;

receiving a second input signal having a second voltage level, wherein the second input signal is associated with a second load; and providing, based on the second input signal, a second output signal from the charge pump to drive the second load, wherein the first voltage level is different from the second voltage level.

2. The method of claim 1, wherein the first and second input signals are received from a voltage regulator and wherein receiving the first input signal comprises level shifting and generating phases based on an input signal from the voltage regulator.

3. The method of claim 1, wherein the first load comprises one or more bits of memory cells, and wherein providing the first output signal comprises providing the first output signal to erase the one or more bits of memory cells.

4. The method of claim 1, wherein the second load comprises one or more words of memory cells, and wherein providing the second output signal comprises providing the second output signal to program the one or more words of memory cells.

5. The method of claim 4, further comprising:
receiving a third input signal having a third voltage level; and
providing, based on the third input signal, a third output signal from the charge pump to drive a third load.

6. The method of claim 5, wherein providing the third output signal comprises providing the third output signal to program verify one or more words of memory cells.

7. The method of claim 1, wherein providing the second output signal comprises providing the second output signal to program verify one or more words of memory cells.

8. An apparatus, comprising:
a regulator adapted to provide a first regulated signal of a first voltage level associated with a first operation mode and a second regulated signal of a second voltage level associated with a second operation mode, wherein the first and second operation modes comprise erase and program modes, respectively, and wherein the first voltage level is different from the second voltage level; and
a pump communicatively coupled to the voltage regulator, the pump adapted to provide a first output signal for the first operation mode based on the first regulated signal and a second output signal for the second operation mode based on the second regulated signal.

9. The apparatus of claim 8, wherein the regulator is a voltage regulator, and further comprising a clock generator communicatively coupled between the voltage regulator and the pump.

10. The apparatus of claim 9, wherein the clock generator is adapted to level shift the first and second regulated signals received from the voltage regulator.

11. The apparatus of claim 10, wherein the voltage regulator is adapted to provide a third regulated signal of a third voltage level associated with a third operation mode and wherein the pump is adapted to provide a third output signal for the third operation mode based on the third regulated signal.

12. The apparatus of claim 11, wherein the third operation mode comprises a verify mode.

13. The apparatus of claim 11, further including memory cells, wherein the first output signal is adapted to erase one or more bits of the memory cells, the second output signal is adapted to program one or more words of the memory cells, and the third output signal is adapted to program verify one or more words of the memory cells.

14. A system, comprising:
an accessing device; and
a memory associated with the accessing device, wherein the memory is adapted to:

provide a first regulated signal of a first voltage level associated with an erase mode, a second regulated signal of a second voltage level associated with a program mode, and a third regulated signal of a third voltage level associated with a program verify mode, wherein at least two of the first voltage level, second voltage level, and third voltage level are different from each other; and
provide a first output signal for the erase mode based on the first regulated signal, a second output signal for the program mode based on the second regulated signal, and a third output signal for the program verify mode based on the third regulated signal.

15. The system of claim 14, wherein the memory comprises a voltage regulator to provide the first, second, and third regulated signals.

16. The system of claim 15, wherein the memory comprises a clock generator for level shifting the first, second, and third regulated signals and for providing the level shifted signals to a voltage pump.

17. The system of claim 15, wherein the memory includes one or more memory cells, wherein the first output signal is adapted to erase one or more bits of the memory cells, the second output signal is adapted to program one or more words of the memory cells, and the third output signal is adapted to program verify one or more words of the memory cells.

18. The system of claim 14, wherein the memory is a flash memory.

19. The system of claim 14, wherein the accessing device is at least one of a camera, computer, telephone, and personal digital assistant.

20. A memory, comprising:
a regulator adapted to provide a regulated signal of a first amplitude during a first operation mode and a regulated signal of a second amplitude during a second operation mode, wherein the first operation mode and the second operation mode comprise any two of a program mode, erase mode, and verify mode wherein the first amplitude and the second amplitude are different from each other; and
a pump adapted to drive at least one of a first load and a second load based on the regulated signal.

21. The memory of claim 20, wherein the pump is adapted to drive the first load based on the regulated signal having the first amplitude and the second load based on the regulated signal having the second amplitude.

22. The memory of claim 21, further comprising a clock generator adapted to generate phase clocks based on the regulated signal.

23. A memory, comprising:
a voltage regulator adapted to provide a regulated signal of a first amplitude during a first operation mode and a regulated signal of a second amplitude during a second operation mode; and
a pump adapted drive a first load based on the regulated signal having the first amplitude and a second load based on the regulated signal having the second amplitude;
wherein the voltage regulator comprises:
a comparator;
a biasing circuit adapted to bias the comparator;
a feedback circuit communicatively coupled to the comparator; and
a voltage translator communicatively coupled to the comparator.

24. A method, comprising:

provide a regulated signal of a first amplitude during at least a portion of a first operation mode and a regulated signal of a second amplitude during at least a portion of a second operation mode, wherein the first operation mode and the second operation mode respectively correspond to erase and program modes and wherein the first amplitude is different from the second amplitude; and driving at least one of a first load and a second load based on the regulated signal.

25. The method of claim 24, wherein driving comprises driving the first load based on the regulated signal having the first amplitude and the second load based on the regulated signal having the second amplitude.

26. The method of claim 25, further comprising generating phase clocks based on the regulated signal.

27. An apparatus, comprising:

means for providing a regulated signal of a first amplitude during at least a portion of a first operation mode and a regulated signal of a second amplitude during at least a portion of a second operation mode, wherein the first operation mode and the second operation mode respectively correspond to erase and program modes, wherein the first amplitude s different from the second amplitude; and means for driving at least one of a first load and a second load based on the regulated signal.

28. An apparatus, comprising:

means for receiving a first input signal having a first voltage level, wherein the first input signal is associated with a first load;

means for providing, based on the first input signal, a first output signal from a charge pump to drive the first load;

means for receiving a second input signal having a second voltage level, wherein the second input signal is associated with a second load; and means for providing, based on the second input signal, a second output signal from the charge pump to drive the second load, wherein the first voltage level is different from the second voltage level.

* * * * *